United States Patent
Plantan et al.

(10) Patent No.: US 6,289,786 B1
(45) Date of Patent: Sep. 18, 2001

(54) BRAKE ACTUATOR HAVING AN IMPROVED PISTON AND METHOD OF MAKING SAME

(75) Inventors: Ronald S. Plantan, Charlotte; Gregory A. Greenly, Harrisburg, both of NC (US)

(73) Assignee: Indian Head Industries Inc., Charlotte, NC (US)

( * ) Notice: Subject to any disclaimer, the term of this patent is extended or adjusted under 35 U.S.C. 154(b) by 0 days.

(21) Appl. No.: 09/532,248

(22) Filed: Mar. 22, 2000

(51) Int. Cl.[7] .............................. F01B 19/00; F16J 3/00; B23P 11/02
(52) U.S. Cl. .......................... 92/101; 29/888.051
(58) Field of Search .................. 92/101; 403/242, 403/278, 279, 280, 281, 282, 285; 29/888.04, 888.05

(56) References Cited

U.S. PATENT DOCUMENTS 4,960,036 * 10/1990 Gummer et al. ................... 92/63
5,218,763 * 6/1993 Marker et al. ................... 29/888.092

* cited by examiner

Primary Examiner—Edward K. Look
Assistant Examiner—Michael Leslie
(74) Attorney, Agent, or Firm—Howard & Howard

(57) ABSTRACT

A vehicle brake actuator including an improved piston assembly having a piston plate including an upstanding annular rim portion and a piston rod including a shank portion having a generally cylindrical head portion and an annular rim portion on a free end of the piston rod head portion which is deformed radially into a cylindrical internal surface of the piston plate upstanding rim portion, permanently attaching the piston plate and rod. The method includes piercing and extruding the upstanding rim portion of the piston plate and forming radially projecting teeth on an external surface of the head portion of the piston rod, driving the head portion of the piston rod into the upstanding rim portion of the piston plate, preventing relative rotation of the piston rod and head. The improved piston assembly of this invention eliminates welding, permitting finishing of the piston rod and plate prior to assembly and reduces cost.

12 Claims, 2 Drawing Sheets

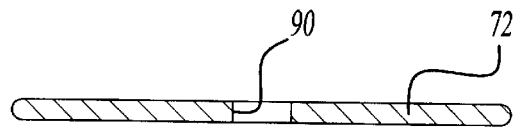
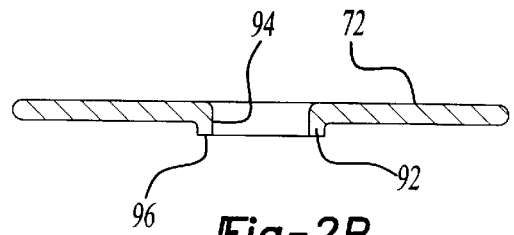
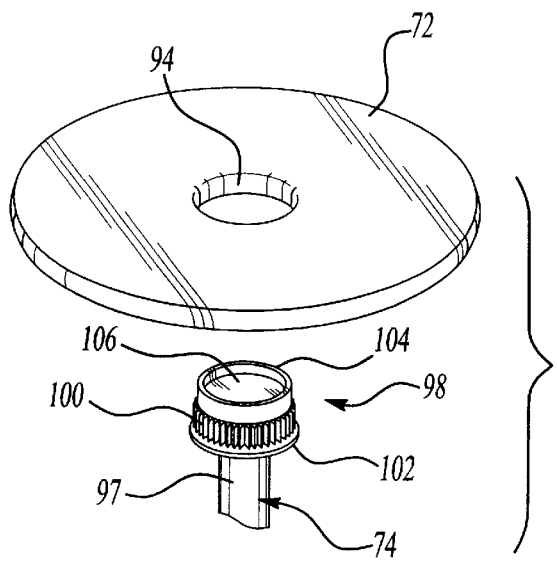
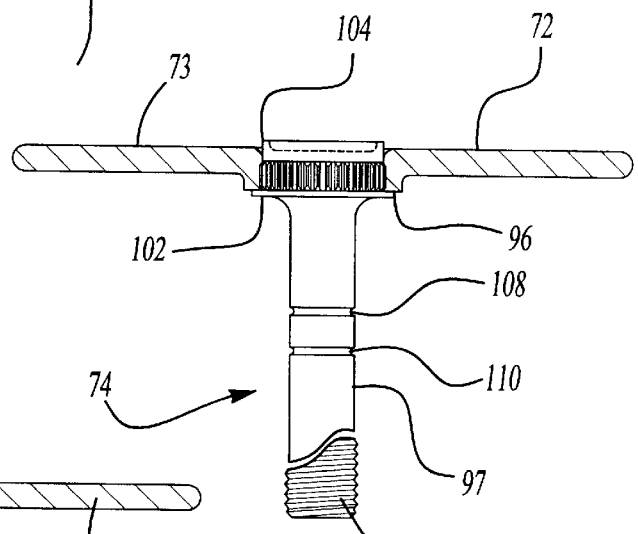
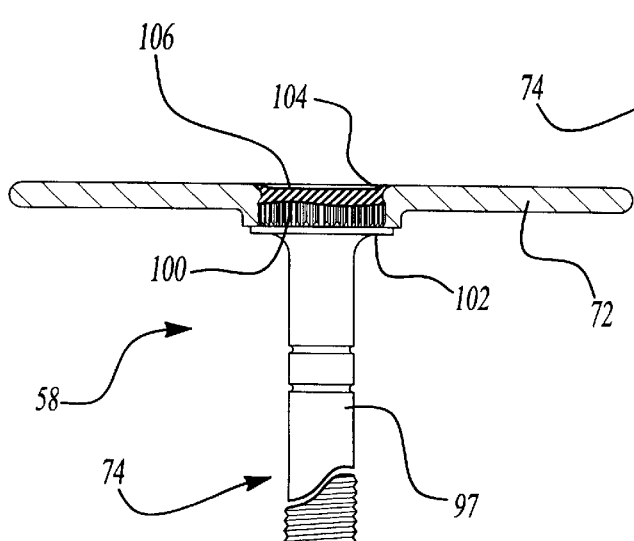

BRAKE ACTUATOR HAVING AN IMPROVED PISTON AND METHOD OF MAKING SAME

FIELD OF THE INVENTION

This invention relates to vehicle brake actuators, including spring brake actuators, having an improved piston assembly which eliminates welding, reduces cost and results in an improved piston.

BACKGROUND OF THE INVENTION

Brake actuators are conventionally used on heavy vehicles having pneumatic braking systems, including trucks, buses and tractor trailers. Conventional brake actuators include a cup-shaped flexible diaphragm, which is supported in the housing, and a piston having a piston plate which is spring biased against the diaphragm. Upon actuation of the pneumatic braking system, air pressure drives the flexible diaphragm and the piston rod or push rod of the piston to actuate the braking system of the vehicle. Conventional brake actuators generally also include an emergency chamber, which may be mounted on the service chamber, having a power spring, which actuates the piston of the service chamber when the pneumatic pressure of the vehicle braking system fails or when the vehicle is turned off, providing an emergency braking system for the vehicle and a parking brake.

The piston of a brake actuator includes a piston rod or push rod, which is generally welded to the piston plate. The welding of the piston rod to the piston plate, however, creates several problems. First, the heat of welding removes any protective coating which may be applied to the parts, requiring a rust protecting paint to the weld area. Rust may still occur, particularly at the weld area, reducing the strength and durability of the assembly. Second, the butt weld of the piston rod to the piston plate may fail, particularly under the bending load and the extreme conditions encountered with brake actuators for heavy vehicles of the type which utilize brake actors. As will be understood by those skilled in this art, brake actuators are mounted under the carriage of the vehicle or tractor adjacent the axles, wherein the brake actuator is subject to extreme temperature variations and road debris including water, salt and ice.

A primary object of the brake actuator piston assembly of this invention is to improve the integrity of the joint between the piston plate and piston rod. A further object is to reduce cost by eliminating the welding of the piston rod to the piston plate, the subsequent coating or painting of the welded joint and permitting the use of a protective finish, such as zinc dichromate finishes. Another object would be to reduce the weight of the piston assembly which requires a piston plate having sufficient thickness to prevent burn-through when the piston rod is butt welded to the piston plate.

SUMMARY OF THE INVENTION

The improved piston of the type used in vehicle brake actuators of this invention is best described by the method of making the piston assembly. A piston of the type used in vehicle brake actuators includes a generally flat piston plate and a piston rod or push rod which extends generally perpendicular to the piston plate from a mid-portion of the piston plate. In the method of making a piston of this invention, a cylindrical opening is formed in a mid-portion of the piston plate. In the most preferred embodiment of the method of this invention, the piston plate is pierced and extruded, forming an annular upstanding rim portion having a flat free end and a generally cylindrical internal surface defining the opening through the piston plate.

The method of this invention further includes forming a piston rod having a shank portion and a generally cylindrical head portion preferably having a diameter slightly greater than the opening through the piston plate. In the most preferred embodiment and method of this invention, the external surface of the cylindrical piston rod head portion includes a plurality of radially extending teeth having a circumferential crest diameter greater than the internal diameter of the piston plate opening. The piston rod head portion further includes a longitudinally projecting annular rim portion on a free end of the head portion, opposite the shank portion. In the most preferred embodiment, the rim portion on the free end of the piston rod is spaced from the radially extending teeth and the internal surface of the rim portion is cylindrical, defining a cylindrical opening or cavity in the free end of the piston rod.

The method of this invention then includes driving the free end of the piston rod head portion into the opening in the piston plate, preferably forming an interference fit between the piston rod head portion and the piston plate. In the preferred embodiment, where an upstanding rib or rim portion is formed in the piston plate, the head portion of the piston rod is driven into the opening in the piston plate from the free end of the upstanding rim or rib on the piston plate and the radial teeth bite into the generally cylindrical internal surface of the opening through the plate providing an interference fit.

The free end of the longitudinal annular rim on the piston rod is then deformed radially outwardly, preferably by swaging, forming a flush mounting of the piston rod to the piston plate which receives the diaphragm in the brake actuator. In the most preferred embodiment, the head portion of the piston plate includes a radial rib adjacent the teeth, opposite the rim portion, which is driven against the flat free end of the radial rim of the piston plate, forming a very secure and accurate assembly. As will be understood by those skilled in this art, the overall length of the piston must be accurately controlled and the radial flange on the piston rod head portion assures that the overall length of the piston is constant for each assembly.

The brake actuator of this invention includes a housing defining a service chamber, a flexible diaphragm is supported within the housing chamber and a piston including a piston rod and a generally flat piston plate is biased against the flexible diaphragm, generally by a return spring. In the most preferred embodiment, the piston plate includes an upstanding annular rim portion, preferably having a generally flat free end and a generally cylindrical internal surface defining an opening through the piston plate. A piston rod including a shank portion and a generally cylindrical head portion is disposed within the piston plate rim portion opening from the free end, forming an interference fit, and an annular rim portion on the free end of the piston rod, opposite the shank portion, is deformed radially outwardly into the internal surface of the piston plate, permanently attaching the piston plate to the piston rod and forming a flush assembly.

The method of making a piston of the type used in a vehicle brake actuator of this invention thus eliminates the requirement for welding the piston rod to the piston plate, permitting the use of pretreated components, such as a zinc dichromate coating on the piston plate and piston rod. The piston rod is preferably cold headed from steel equivalent to a Grade 2 cold headed bolt. The push rod head portion is firmly secured in the extruded longitudinal rim portion of the piston plate, reducing bending of the push rod as the push rod reciprocates in an arcuate motion to actuate the braking system of the vehicle. Further, the thickness of the piston plate may be reduced without sacrificing the integrity of the joint, thereby reducing the overall weight of the piston.

The improved piston and method of forming a piston assembly for a brake actuator of this invention thus significantly improves the integrity of the joint between the piston rod and the piston plate while reducing cost and weight. Other advantages and meritorious features of this invention will be more fully understood from the following description of the preferred embodiments, the appended claims, and the drawings, a brief description of which follows.

BRIEF DESCRIPTION OF THE DRAWINGS

FIGS. 2A and 2B are cross-sectional views of the piston plate illustrating the preferred method of forming the piston plate;

FIG. 3 is a side perspective view of the improved piston plate and piston rod of this invention prior to assembly;

FIG. 4 is a side partially cross-sectioned view of the piston plate during assembly; and FIG. 5 is a side partially cross-section view of the improved piston following assembly.

DESCRIPTION OF THE PREFERRED EMBODIMENTS

Figure 1:
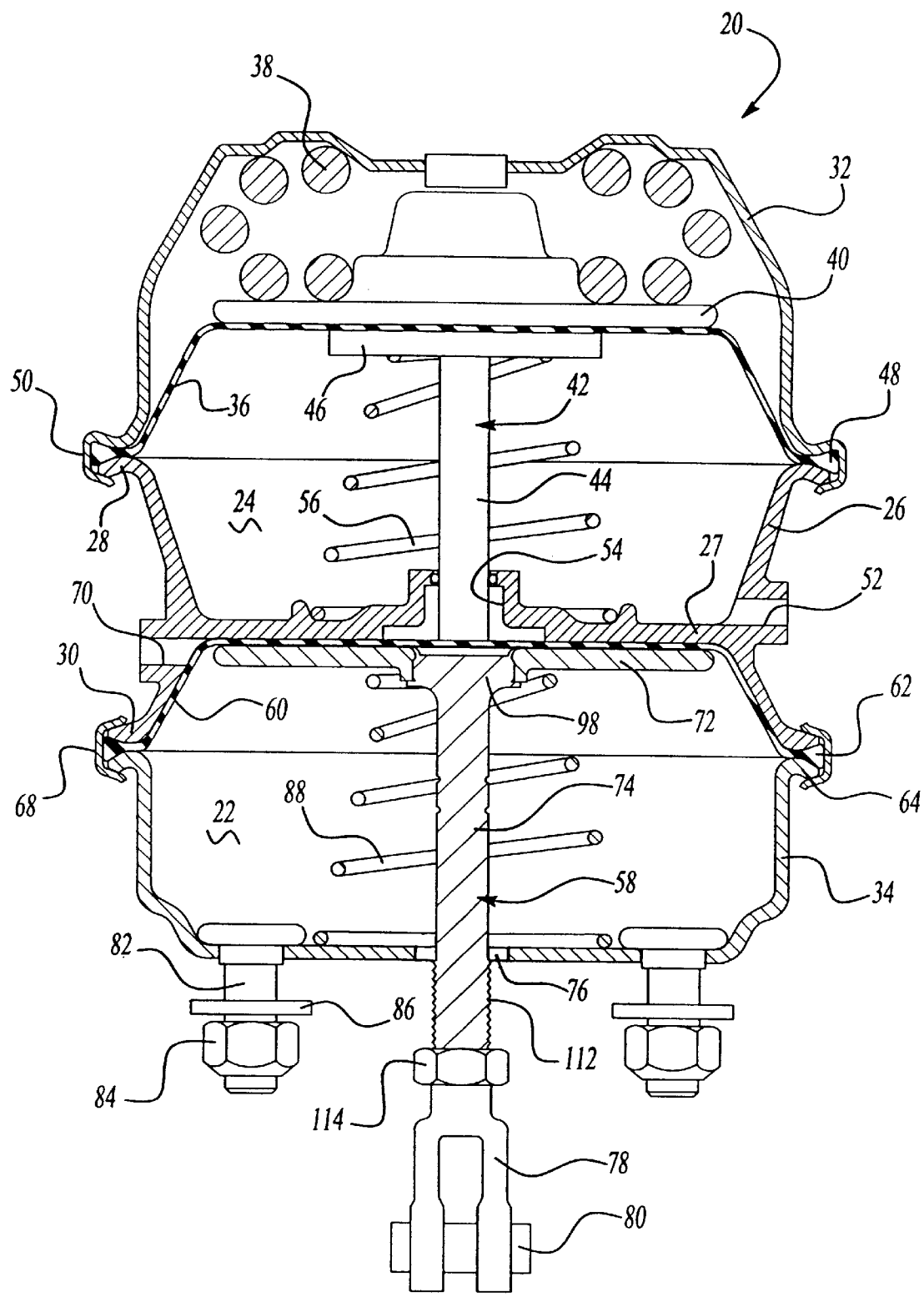
FIG. 1 is a cross-sectional view of a conventional dual diaphragm spring brake actuator having the improved piston assembly of this invention.

FIG. 1 illustrates a dual diaphragm spring brake actuator 20 of the type disclosed in U.S. Pat. No. 4,960,036, assigned to the assignee of the present application, having the improved piston assembly of this invention. The illustrated dual diaphragm spring brake actuator includes a service chamber 22, which normally actuates the vehicle braking system as described below, and an emergency chamber 24 which actuates the vehicle braking system when the vehicle pneumatic pressure drops below a predetermined pressure in an emergency situation or as a parking brake when the vehicle is turned off. As will be understood, however, the improved piston assembly of this invention may be utilized with any type of brake actuator, such as a separate service chamber, a piston-type brake actuator, and the like.

The dual diaphragm spring brake actuator 20 illustrated in FIG. 1 includes a service chamber 22 and an emergency chamber or spring chamber 24. The disclosed embodiment of the brake actuator 20 includes a flange case 26 which may, for example, be formed of cast aluminum, having a central web portion 27 which separates the service chamber 22 from the emergency chamber 24. The flange case includes radial flanges 28 and 30 for attachment of the cover 32 or head of the emergency chamber and the service chamber housing 34. The spring chamber 24 includes a cup-shaped flexible diaphragm 36 and a power spring 38 which actuates the brake of the braking system when the pneumatic pressure falls below a predetermined pressure as described below. The power spring 38 reacts against the head 32 and spring piston 40. The emergency chamber further includes a piston 42 having a piston rod 44 and a piston head 46. In the disclosed embodiment, the peripheral edge 48 of the cup-shaped flexible diaphragm 36 is received on the flange 28 of the flange case 26 and secured in place by the skirt portion 50 of the head 32 by crimping or the like as disclosed in the above-referenced U.S. patent. The flange case 26 includes a pneumatic port 52 connected to the pneumatic braking system of the vehicle (not shown). During normal operation of the brake actuator, the emergency chamber 24 is pressurized through port 52, biasing the diaphragm 36 upwardly as shown in FIG. 1, compressing the power spring 38. When the pressure in the emergency chamber 24 falls below a predetermined pressure or when the vehicle is turned off, the power spring 38 expands against the spring piston 40, inverting the diaphragm 36 and driving the piston rod 44 through opening 54 in the flange case and driving the piston assembly 58 to actuate the brakes as described below.

The service chamber also includes a cup-shaped flexible diaphragm 60 having a peripheral edge 62 which is received on the flange 64 of the service chamber housing and the clamp 68 secures the flange 64 of the service chamber housing 34 to the flange 30 of the flange case 26 in sealed relation with the peripheral edge 62 of the diaphragm 60 located therebetween. The flange case 26 includes a service chamber port 70 which receives air pressure from the pneumatic braking system upon actuation of the vehicle brakes. The pneumatic pressure inverts the cup-shaped flexible diaphragm 60, driving the piston plate 72 downwardly in FIG. 1, which drives the piston rod 58 through opening 76 in the service chamber housing 34, actuating the braking system of the vehicle (not shown). The free end of the piston rod is connected to a clevis 78 and the clevis 78 is connected to the braking system of the vehicle by clevis pin 80. The service chamber housing 34 is mounted on a bracket (not shown) under the vehicle carriage by mounting bolts 82, lock nuts 84 and washers 86. Upon release of the brake by the vehicle operator, the pneumatic pressure from the vehicle through port 70 returns to zero and the return spring 88 returns the piston 58 and the diaphragm 60 to the position shown in FIG. 1.

Thus, the operation of the brake actuator 20 illustrated in FIG. 1 may be briefly described as follows. During normal operation of the vehicle, when the brake is actuated in the vehicle by the operator, air pressure is delivered to port 70 in the flange case 26, inverting the cup-shaped flexible diaphragm 60 which drives the piston rod or push rod 58 through opening 76 in the service chamber housing 34, actuating the brake. Upon release of the brake pedal, the pressure through port 70 returns to zero and the return spring 88 returns the piston 58 to the position shown in FIG. 1. The air pressure through line 52 retains the pressure in emergency chamber 24, maintaining the compression of power spring 38 as shown in FIG. 1. However, when the pneumatic pressure in emergency chamber 24 falls below a predetermined pressure when the vehicle is turned off or when the pneumatic braking system fails, the power spring 38 expands, driving the piston rod 44 through opening 54 in the web 27 of the flange case 26, driving the piston rod 58 of the emergency chamber through opening 76 in the service chamber housing 34, actuating the brake. The dual diaphragm spring brake actuator 20 thus operates during normal braking of the vehicle and during emergency situations to stop a runaway truck.

The clevis 78 may be connected directly to the vehicle brake or more commonly to a slack adjuster, such as an automatic slack adjuster commonly used in vehicles of the type having brake actuators. Thus, the clevis 78 must follow the free end of the slack adjuster (not shown), which is an arcuate motion, subjecting the piston assembly 58 to substantial bending forces. That is, the piston rod 74 will rock in an arcuate motion during braking of the vehicle, which results in a bending force between the piston rod 74 and the piston plate 72. Further, as will be understood by those skilled in the art, the brake actuator 20 will be subject to extreme conditions. As described above, brake actuators are normally mounted beneath the vehicle chassis where the brake actuator is subject to extreme vibrational loads, temperature variations and road debris, including water, salt, ice and dirt. Although most manufacturers of brake actuators include a stone shield which partially seals the opening 76 in the service chamber housing 34, moisture will still enter the service chamber 22 requiring protection of the components. In a conventional brake actuator of this type, the piston rod 74 is welded to the piston plate 72 and later coated with a protective coating, such as a protective paint. Nevertheless, failures still occur in the weld between the piston rod 58 and the piston plate 72.

FIGS. 2–5 illustrate an improved piston assembly 58 and a method of making the piston assembly. In the preferred method of making the piston assembly of this invention, an opening 90 is pierced in the piston plate as shown in FIG. 2A and the area around the opening is then extruded as shown in FIG. 2B. The extrusion step forms an upstanding annular rib or rim portion 92, preferably having a generally cylindrical internal surface 94 and a generally flat free end 96. The piston rod 74 in the preferred embodiment of the piston assembly and method of this invention includes an enlarged generally cylindrical head portion 98 having relatively sharp radially projecting teeth 100, a radial flange 102 adjacent the shank portion 97 and a longitudinal annular rim 104 surrounding a cylindrical cavity or recess 106 as best shown in FIG. 3. In the preferred embodiment, the diameter of the head portion 98 is selected to form an interference fit with the internal surface 94 of the piston plate 72. In the most preferred embodiment, the interference fit is provided by the radially projecting teeth 100, wherein the circumference defined by the crest diameter is greater than the internal diameter of the generally cylindrical opening 94 in the piston plate 72. In a typical application, the crest diameter of the teeth 100 will be approximately 0.03 inches greater than the internal diameter of the generally cylindrical internal surface 94 of the piston plate. However, the diameter of the annular longitudinal rim 104 may be equal to or slightly less than the diameter of the internal cylindrical surface 94.

After forming the piston plate 72 and the piston rod 74 as shown in FIGS. 2 and 3, the generally cylindrical head portion 98 is driven into the opening in the piston plate from the upstanding rim 92, as shown in FIGS. 3 and 4. Because of the interference fit between the head 98 of the piston rod 74 and the cylindrical surface 94 of the piston plate, the teeth 100 bite into the cylindrical surface 94 as shown in FIG. 4. As the head 98 is driven into the opening in the piston plate 72, the radial flange 102 on the piston head engages the relatively flat free end 96 of the upstanding rim 92, accurately locating the piston rod in the piston plate and very accurately controlling the overall length of the piston assembly 58. As best shown in FIG. 4, the end of the longitudinal lip 104 of the piston rod head extends slightly above the adjacent surface 73 of the piston plate 72. The final step in the assembly of the piston rod to the piston plate is to radially deform the longitudinal rim 104 as shown in FIG. 5 as by swaging. This forms a very secure assembly as discussed more fully hereinbelow.

The piston rod and piston plate assembly 58 shown in FIG. 5 has several important advantages over the prior art methods of attaching the piston rod to the piston plate by welding as described above. Where the piston rod is welded to the piston plate, the welding operation will remove any finish applied to the components. The piston rod 74 of this invention may be formed by conventional cold heading techniques and may include a protective finish, such as zinc dichromate. Similarly, the piston plate 72 may include a protective finish, such as zinc dichromate, which will protect the components from corrosion due to salt and moisture. The piston assembly 74 of this invention is also able to withstand bending loads, particularly where the piston plate 72 includes an upstanding annular rim portion 92. Further, as discussed above, the overall length of the piston assembly 58 may be very accurately controlled. As will be understood by those skilled in this art, the overall length of the piston must be accurately controlled because the piston actuates the brakes. The shank portion 97 of the piston rod may include indicia, such as grooves 108 and 110, which indicate an overstroke condition as is presently conventional in this art. Further, the end of the shank portion may be threaded as shown at 112 for attachment of the piston to the yoke 108 shown in FIG. 1. As will be understood, the yoke 78 includes an internally threaded bore (not shown) and the yoke is fixed to the threaded portion 112 by nut 114. The piston assembly 58 is also less expensive than a welded assembly because of the elimination of the welding step. Thus, the piston assembly 58 and method of forming the piston has several significant advantages over the prior art.

As will be understood by those skilled in this art, various modifications may be made to the brake actuator and method of forming a piston of this invention within the purview of the appended claims. For example, as described above, the improved piston assembly 58 may be used with any brake actuator, particularly in service chambers of the type described herein. As will be understood, the piston 42 in the emergency chamber 24 is not subject to the bending loads described above. Therefore, the piston head 46 may be conventionally secured to the piston rod 44 with a screw (not shown). However, the piston assembly 42 may also be replaced by the improved piston assembly of this invention. Further, the configuration of the piston plate 72 and the shank portion 97 may be modified as required by the particular application. Other protective finishes other than zinc dichromate may also be used and various steels may be used to form the piston plate and piston rod. Finally, as described above, the thickness of the piston plate may be reduced because the welding step has been eliminated, thereby further reducing the weight of the piston assembly. Having described the preferred embodiments of the invention, the invention is now claimed as follows.

What is claimed is:

1. A method of making a piston of the type used in vehicle brake actuators including a generally flat piston plate and a piston rod extending generally perpendicular to said piston plate from a mid-portion of said piston plate, said method comprising:

forming a generally cylindrical opening in a mid-portion of said piston plate;

forming a piston rod including a shank portion and a generally cylindrical head portion having a diameter greater than an internal diameter of said piston plate opening and a longitudinally projecting annular rim portion on a free end of said head portion opposite said shank portion;

driving said piston rod head portion free end into said opening in said piston plate, forming an interference fit; and deforming said rim portion of said piston rod head portion radially outwardly, permanently affixing said piston rod to said piston plate.

2. The method of making a piston as defined in claim 1, wherein said method includes forming a plurality of radially projecting teeth on an external surface of said piston rod generally cylindrical head portion, then driving said teeth into said piston plate opening with said teeth biting into said piston plate forming said interference fit and preventing relative rotation between said piston rod and said piston plate.

3. The method of making a piston as defined in claim 1, wherein said method includes piercing said opening in said piston plate and extruding an annular upstanding rim portion surrounding said opening, said rim portion having an internal diameter smaller than said diameter of said piston rod head portion, then driving said head portion of said piston rod into said annular upstanding annular rim portion of said piston plate.

4. The method of making a piston as defined claim 3, wherein said method includes forming a plurality of radially projecting relatively sharp teeth on an external surface of said generally cylindrical piston rod head portion, said teeth having free edges defining a major crest diameter greater than said internal diameter of said upstanding rim portion, and driving said head portion into said upstanding rim portion from a free end of said upstanding rim portion, said teeth biting into said upstanding rim portion and preventing relative rotation of said piston plate and said piston rod.

5. The method of making a piston as defined in claim 1, wherein said method includes forming a radial flange on said piston rod head portion spaced from a free end of said head portion, then driving said piston rod head portion into said piston plate opening until said radial flange engages said piston plate.

6. A method of making a piston of the type used in vehicle brake actuators including a generally flat piston plate and a piston rod extending generally perpendicular to said piston plate from a mid-portion of said piston plate, said method comprising:

piercing an opening in a mid-portion of said piston plate and extruding an annular upstanding rim portion surrounding said opening having a free end and a generally cylindrical internal surface;

forming a piston rod including a shank portion and a generally cylindrical head portion having a diameter greater than an internal diameter of said generally cylindrical internal surface of said piston plate upstanding rim portion and a longitudinally projecting annular rim portion on a free end of said head portion, opposite said shank portion;

driving said piston rod head portion into said free end of said piston plate upstanding rim portion forming an interference fit; and deforming said piston rod head portion annular rim portion radially outwardly, permanently affixing said piston rod to said piston plate.

7. The method of forming a piston as defined in claim 6, wherein said method includes forming a plurality of radially projecting teeth on an external surface of said push rod generally cylindrical head portion having free edges, said free edges of said teeth defining a major crest diameter greater than an internal diameter of said internal surface of said piston plate upstanding rim portion, and driving said head portion into said piston plate upstanding rim portion from said free end of said upstanding rim portion, said teeth biting into said internal surface of said upstanding rim portion and preventing relative rotation of said piston plate and said piston rod.

8. The method of making a piston as defined in claim 6, wherein said method includes forming a radial flange on said piston rod head portion spaced from said free end having a diameter greater than said generally cylindrical internal surface of said piston plate upstanding rim portion and driving said piston rod head portion into said piston plate upstanding rim portion until said radial flange portion engages said free end of said piston plate upstanding rim portion.

9. The method of making a piston as defined in claim 8, wherein said annular rim portion of said piston rod head portion is radially deformed by swaging.

10. A vehicle brake actuator, comprising:
a housing defining a chamber, a flexible diaphragm supported in said housing chamber and a piston including a piston rod and a generally flat piston plate biased against said flexible diaphragm, said piston plate having an upstanding annular rim portion including a free end and a generally cylindrical internal surface defining an opening through said piston plate, a piston rod including a shank portion and a generally cylindrical head portion disposed within said upstanding rim portion opening from said free end forming an interference fit and an annular rim portion on a free end of said piston rod opposite said shank portion deformed radially into said internal surface of said piston plate upstanding rim portion, permanently attaching said piston plate and said piston rod.

11. The vehicle brake actuator defined in claim 10, wherein said piston rod head portion includes a plurality of radially extending teeth biting into said generally cylindrical internal surface of said piston plate upstanding rim portion.

12. The vehicle brake actuator defined in claim 10, wherein said piston rod head portion includes a radial flange spaced from said annular rim portion engaging said free end of said upstanding annular rim portion of said piston plate.

* * * * *